(12) United States Patent
Cradit

(10) Patent No.: US 7,278,948 B2
(45) Date of Patent: Oct. 9, 2007

(54) "ZERO" LASH SPHERICAL DIFFERENTIAL ASSEMBLY USING SPRING WASHERS

(75) Inventor: Jeremy L. Cradit, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 208 days.

(21) Appl. No.: 11/113,912

(22) Filed: Apr. 25, 2005

(65) Prior Publication Data

US 2006/0240934 A1    Oct. 26, 2006

(51) Int. Cl.
 *F16H 48/06* (2006.01)
(52) U.S. Cl. ..................................... 475/235
(58) Field of Classification Search ............... 475/230, 475/235, 240
See application file for complete search history.

(56) References Cited

U.S. PATENT DOCUMENTS

| | | | |
|---|---|---|---|
| 3,413,964 A | 12/1968 | Pask | |
| 3,815,442 A | 6/1974 | McAninch et al. | |
| 3,815,443 A | 6/1974 | McAninch et al. | |
| 4,752,178 A * | 6/1988 | Greenhill | 411/521 |
| 5,193,501 A | 3/1993 | Klejeski et al. | |
| 5,362,284 A | 11/1994 | Brewer | |
| 5,529,547 A * | 6/1996 | Okuda et al. | 475/249 |
| 6,066,063 A | 5/2000 | Ishikawa | |
| 6,470,988 B1 * | 10/2002 | Beesley | 180/245 |

FOREIGN PATENT DOCUMENTS

| | | |
|---|---|---|
| JP | 57129949 A * | 8/1982 |
| JP | 58137643 A * | 8/1983 |

* cited by examiner

*Primary Examiner*—Charles A. Marmor
*Assistant Examiner*—Justin K. Holmes
(74) *Attorney, Agent, or Firm*—Harness, Dickey & Pierce, P.L.C.

(57) ABSTRACT

A differential assembly includes a differential housing including a substantially spherically shaped chamber. A pair of spherically shaped side gears are rotatably positioned in the chamber in driving communication with a pair of spherically shaped pinion gears. A pair of springs are positioned in engagement with the end faces of the side gears to minimize gear lash between the side gears and the pinion gears.

16 Claims, 2 Drawing Sheets

"ZERO" LASH SPHERICAL DIFFERENTIAL ASSEMBLY USING SPRING WASHERS

BACKGROUND AND SUMMARY OF THE INVENTION

The present invention relates generally to automotive differentials and, more particularly, to a differential assembly including spring washers to place the differential gears in a zero lash condition.

Present differential assemblies are used in a drive train of motor vehicles for delivering drive torque to the wheels while permitting speed differentiation therebetween. In order to provide easily assembled and properly functioning differential gearsets, a lash or clearance is designed to exist between the pinion gears and the side gears within the differential assembly. Excessive lash has been known to cause a "clunk" sound that is sometimes audible to the driver when the vehicle changes direction of travel. While such noises emanating from the drive train may have been previously tolerated by original equipment manufacturers, the present acceptance level for such undesirable noises is low.

Additionally, some presently produced differential assemblies include a housing having a spherical cavity in receipt of partially spherically shaped pinion gears and side gears. The use of spherically shaped components has allowed for increased structural durability of the driveline components and may be desirable. Furthermore, spherical shapes are easier to manufacture and allow tighter tolerances that provide for reduced lash between the gears. The use of spherically shaped side gears has substantially reduced the "back face" area on which a spring or other biasing device may be positioned to bias the side gears toward the pinion gears to reduce gear lash. As such, use of a relatively large Belleville washer adjacent to a side gear having a relatively large planar back surface area is no longer a feasible design solution. Accordingly, it may be desirable to produce a differential assembly having spherically shaped components using spring washers to provide a zero lash assembly.

The present invention differential assembly includes a differential housing adapted to be rotatably driven by an input shaft. The housing includes a chamber having a substantially spherically shaped inner surface with shaft openings at opposite ends of the chamber. A pair of side gears are rotatably positioned in the chamber. The side gears are adapted to be non-rotatably mounted to output shafts, which extend through the shaft openings. Each side gear includes a spherically shaped surface with a trunnion having an end face. A pair of differential pinions are rotatably mounted within the chamber. The pinions have a longitudinal axis perpendicular to the axis of the side gears with each of the pinions being meshed with each of the side gears. Each of the pinions includes a spherically shaped surface. A pair of pinion thrust washers each having spherically shaped inner and outer surfaces are positioned between the housing inner surface and one of the spherically shaped surfaces of the pinion. Similarly, a pair of side gear thrust washers each has spherically shaped inner and outer surfaces. Each of the side gear thrust washers are positioned between the housing inner surface and one of the spherically shaped surfaces of the side gears. A pair of springs are positioned within the chamber. Each spring is engaged with one of the end faces of the side gears to minimize gear lash between the side gears and the pinion gears.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWING

The present invention will become more fully understood from the detailed description and the accompanying drawing, wherein.

DETAILED DESCRIPTION OF THE PREFERRED EMBODIMENT

The following description of the preferred embodiment is merely exemplary in nature and is in no way intended to limit the invention, its application, or uses.

Figure 1:
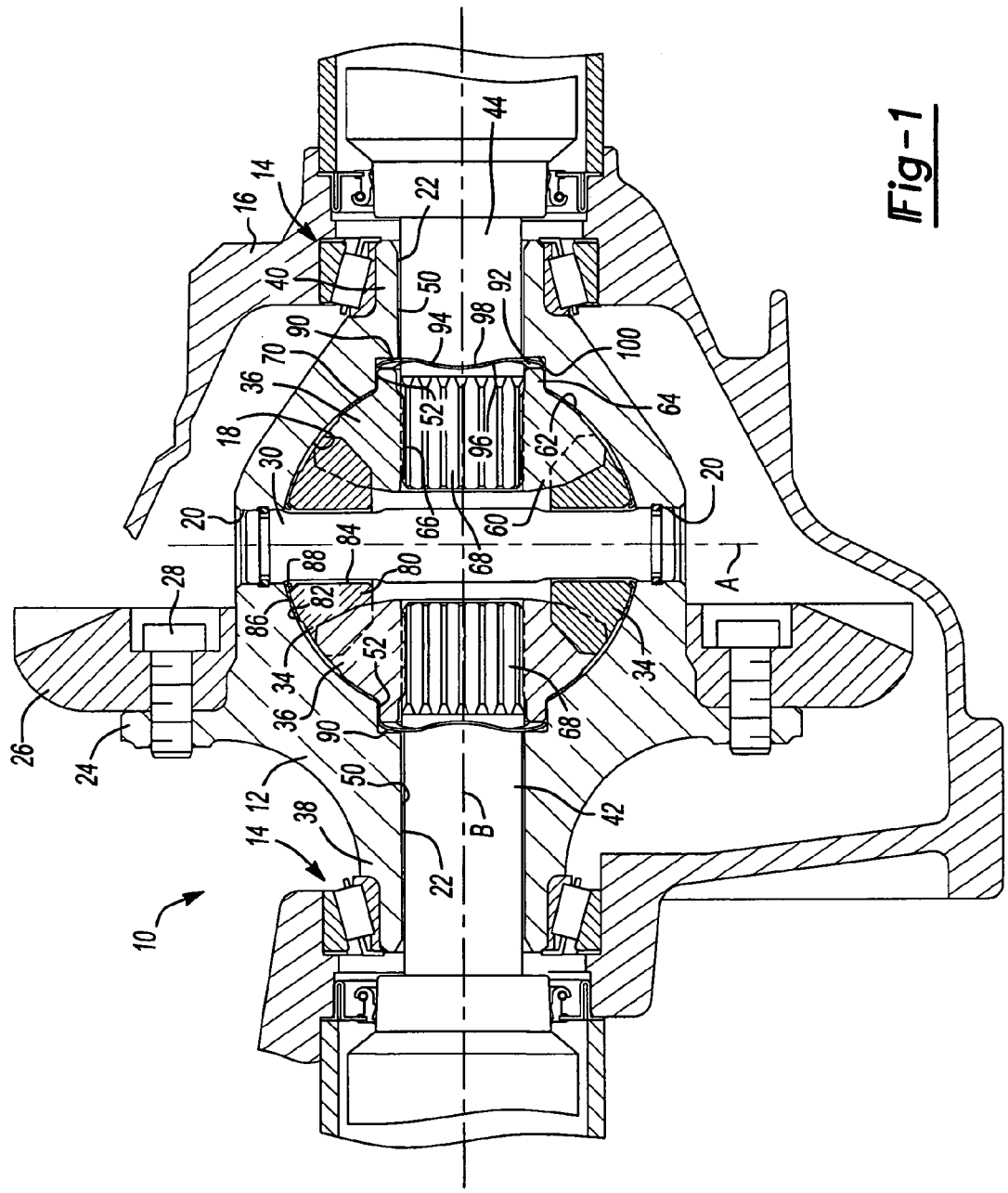
FIG. 1 is cross-sectional view of a differential assembly equipped with spring washers incorporated into an exemplary motor vehicle axle assembly.

Referring to FIG. 1, a differential assembly 10 is shown to include a differential case 12 supported at its opposite axial ends by bearing assemblies 14 for rotation relative to a differential carrier or housing 16. Housing 16 can be part of an axle assembly of the type used in rear-wheel drive vehicles or, in the alternative, can be incorporated into the transaxle of a front-wheel drive vehicle. Differential case 12 is formed to include an enlarged interior chamber 18 within which a gearset is retained. Differential case 12 also includes a pair of first apertures 20 and a pair of second apertures 22, with both pairs of apertures communicating with chamber 18. In addition, differential case 12 includes a radial flange 24 to which a ring gear 26 is secured, such as by bolts 28. A pinion shaft 30 extends between first apertures 20 and is rigidly fixed to differential case 12 by a snap ring (not shown).

The gearset includes a pair of pinion gears 34 which are supported on pinion shaft 30 within chamber 18 for rotation about its longitudinal axis, denoted in FIG. 1 by construction line "A". Each pinion gear 34 is meshed with a pair of side gears 36 which, in turn, are each journally supported for rotation about the longitudinal axis of differential case 12, denoted by construction line "B". The axial ends of differential case 12 define a pair of tubular hubs 38 and 40 which journally support a pair of axle shafts 42 and 44, respectively, and upon which bearing assemblies 14 are mounted. One end of axle shaft 42 is fixed (i.e., splined) to one of side gears 36 while its opposite end is fixed to one of the vehicle's wheels. Similarly, one end of axle shaft 44 is fixed (i.e., splined) to the other one of side gears 36 while its opposite end is fixed to the other of the vehicle's wheels. As is conventional, ring gear 26, and differential case 12 to which it is attached, are rotated within housing 16 by an input drive pinion (not shown) which is secured to the end of a drive shaft (not shown). As such, rotary motion of case 12 is delivered to axle shafts 42 and 44 through engagement of pinion gears 34 and side gears 36 to permit relative rotation therebetween.

Chamber 18 is substantially spherically shaped and communicates with the pair of apertures 22 aligned along axis "B". Each aperture 22 is shaped as an axial bore having a first segment 50 adapted to receive one of axle shafts 42, 44 therein and a second segment 52 adapted to receive an axial hub segment of one of the side gears 36 therein. Second segment 52 has a greater diameter than first segment 50 and functions to properly seat side gear 36 relative to chamber 18 and aperture 22.

Side gears 36 are shown to include a front gear segment 60, a rear thrust face 62, and an axial hub 64. Internal splines 66 formed in hub 64 are provided for meshed engagement with corresponding external splines 68 on the axle shafts. Rear thrust face 62 is substantially spherical in contour and is configured to match the local contour of chamber 18. Side gear thrust washers 70 are positioned between chamber 18 and each side gear 36 to absorb thrust loading and provide a hardened sliding surface against which each side gear 36 can rotate.

Differential 10 is shown to include pinion gears 34 each having a front gear segment 80, a rear thrust face 82, and a bore 84 adapted to receive pinion shaft 30 therein. Rear thrust face 82 is partially spherical in contour and is configured to match the spherical contour of chamber 18. Partially spherical thrust plates 86 are also used in association with pinion gears 34 to provide a hardened sliding surface relative to case 12. Thrust plates 86 include an inwardly extending lip 88 positioned within bore 84 to maintain the proper position of each thrust plate 86 relative to each pinion gear 34.

One skilled in the art will appreciate that a predetermined play or lash exists between side gear 36 and differential case 12 such that each side gear 36 may axially move between a zero lash position where the side gear displacement is limited by the pinion gears and a maximum lash position where the side gears displacement is limited by the side gear thrust washers 70 and the differential case 12. Accordingly, each side gear 36 may axially translate a predetermined distance between a zero lash position and a maximum lash position depending on the load applied to the gears during operation. In the zero lash position, a minimal clearance exists between the teeth of each side gear 36 and the teeth of each pinion gear 34. Therefore, when the ring gear switches from being driven on a drive side of the teeth to contacting the pinion with the coast side of the ring gear teeth, only a small distance exists between the previous coast face of the gear that is now to be in contact with the pinion. Accordingly, the driving gear is not allowed to increase speed and impact into the driven gear face as would occur if a large lash were present. By reducing the distance between the gear tooth faces, the noise generation or "clunk" sound is reduced or eliminated. In a maximum lash position, the clearance between the gear teeth is at its maximum and noise generation is likely.

To maintain the position of side gears 36 at the zero lash position as often as possible, a pair of spring washers 90 are positioned within second segments 52 of apertures 22. Each spring washer 90 biasedly engages an end face 92 formed on the axial hub 64 of each side gear 36.

Figure 2:
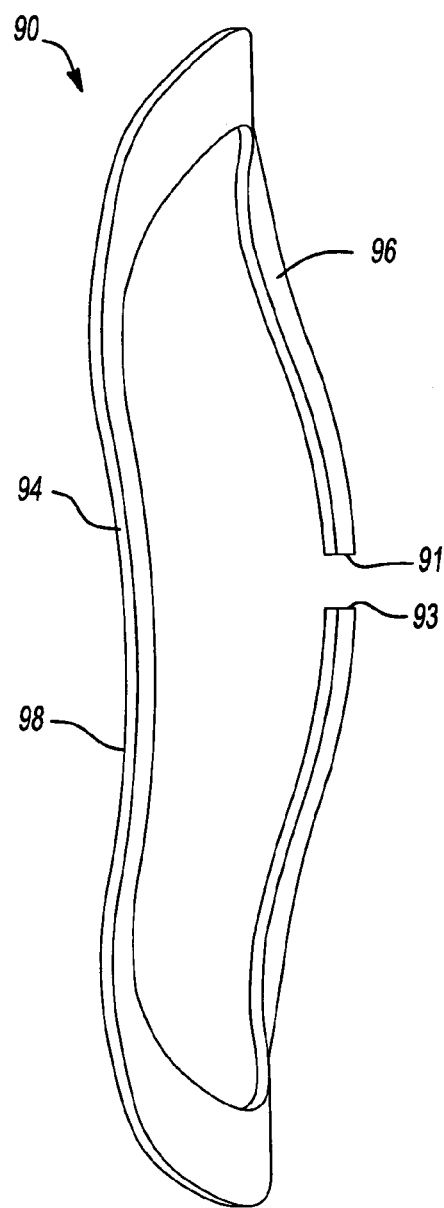
FIG. 2 is a perspective view of a first embodiment spring washer.

FIG. 2 depicts a first embodiment spring washer 90 being shaped as a gap spring having a first end 91 spaced apart from a second end 93. The gap design permits radial expansion within a cavity without binding. The washer includes a substantially constant thickness with convolutions 94 such that neither of opposing first and second surfaces 96 and 98 of spring washer 90 lie on a single plane. Spring washer 90 is constructed from a substantially resilient material such that the washer has a tendency to return to its original shape including the convolutions previously described. Accordingly, if a load is applied to attempt to flatten convolutions 94, the material of the spring washer 90 resists this load. More particularly, the convolutions 94 and spring washer 90 are sized to define an overall height greater than the maximum distance between end face 92 of side gear 36 and a land 100 formed within second segment 52. After installation of each of the differential gears and spring washers 90, each spring washer 90 provides a biasing force on each side gear 36 tending to urge each side gear 36 into further engagement with each pinion gear 34.

Figure 3:
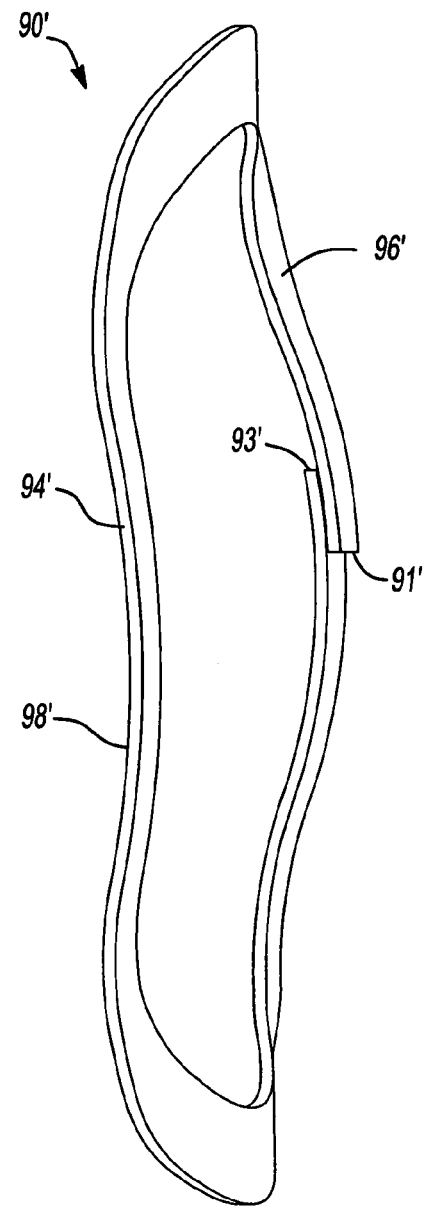
FIG. 3 is a perspective view of a second embodiment spring washer.

FIG. 3 depicts an alternate embodiment spring washer 90'. Spring washer 90' functions substantially similarly to spring washer 90. As such like elements will be identified with similar reference numerals including "prime" designation. Spring washer 90' is an overlap-type spring such that ends 91' and 93' overlap one another. Smalley Steel Ring Company constructs wave springs of both the gap and overlap types. One skilled in the art will appreciate that other forms of springs such as nested, crest-crest and coil springs are also contemplated as being within the scope of the invention.

In operation, differential assembly 10 functions to provide a noise reduction feature at very low cost. Specifically, when the vehicle is traveling along a substantially straight line, little to no speed differentiation between axle shafts 42 and 44 is required. At this time, spring washer 90 exhibits sufficient force to place each side gear 36 in a zero lash position. If the vehicle operator causes the drive and coast faces of the ring gear to alternately contact the pinion by either changing vehicle direction or by accelerating and decelerating using the throttle, the side gears will be in close engagement with the pinion gears and a clunking noise will not be emanated. When the vehicle is traveling along an arc, speed differentiation is required. During speed differentiation, a separating load is applied to each side gear 36 urging each side gear toward the maximum lash position. Side gear thrust washers 70 and differential case 12 limit the axial translation of each side gear 36 because the side gear load imparted during speed differentiation is much greater than the biasing load provided by spring washers 90. In this manner, side gear thrust washers 70 react a majority of the side load. To increase the longevity and minimize the wear on each spring washer 90, the distance between end face 92 and land 100 is maintained at a predetermined minimum distance when side gears 36 are located in the maximum lash position. The minimum distance is calculated to assure that the spring washers 90 are not flattened into a substantially planar position but that a minimum convolution height exists. This design philosophy increases the life of the spring by maintaining the spring stress within a desired operating range throughout the life of the differential assembly.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A differential assembly for supplying driving torque from an input shaft to a pair of output shafts, the differential assembly comprising:

a differential housing adapted to be rotatably driven by the input shaft, said housing defining a chamber having a substantially spherically shaped inner surface and having shaft openings at opposite ends thereof;

a pair of side gears rotatably positioned in said chamber, said side gears being adapted to be non-rotatably mounted to the output shafts which extend through said shaft openings, each side gear including a substantially spherically shaped surface and a trunnion having an end face;

a pair of differential pinions rotatably mounted within said chamber, said pinions having a longitudinal axis perpendicular to the axis of said side gears with each of said pinions being meshed with each of said side gears, each of said pinions including a substantially spherically shaped surface;

a pair of pinion thrust washers each having substantially spherically shaped inner and outer surfaces positioned between said housing inner surface and one of said substantially spherically shaped surfaces of said pinions;

a pair of side gear thrust washers each having substantially spherically shaped inner and outer surfaces positioned between said housing inner surface and one of said substantially spherically shaped surfaces of said side gears; and a pair of springs positioned within said chamber, each spring being engaged with one of said end faces on said trunnions of said side gears to minimize gear lash between said side gears and said pinions.

2. The differential assembly of claim 1 wherein said springs are shaped as washers having serpentine convolutions.

3. The differential assembly of claim 2 wherein said springs include apertures adapted to allow the output shafts to pass therethrough.

4. The differential assembly of claim 1 wherein said side gear thrust washers are operable to react loads generated during speed differentiation and limit the load transferred to said springs.

5. The differential assembly of claim 4 further including a pinion shaft coupled to said differential housing and extending across said chamber, said pinions being rotatably supported by said pinion shaft.

6. The differential assembly of claim 5 wherein said differential housing includes a pair of counterbores in communication with said chamber, said trunnions of said side gears being rotatably supported within said counterbores.

7. The differential assembly of claim 6 wherein said springs are positioned within said counterbores.

8. A differential assembly for supplying driving torque from an input shaft to a pair of output shafts, the differential assembly comprising:

a differential housing adapted to be rotatably driven by the input shaft, said housing defining a chamber having shaft openings at opposite ends thereof;

a pair of side gears disposed in said chamber, said side gears being adapted to be non-rotatably mounted to the output shafts which extend through said shaft openings, each side gear being moveable along a longitudinal axis;

a pair of differential pinions rotatably mounted within said chamber, said pinions having a longitudinal axis perpendicular to the axis of said side gears with each of said pinions being meshed with each of said side gears;

a pair of side gear thrust washers, each being shaped to complement a surface of said chamber and a surface of one of said side gears, wherein said pinions and said side gear thrust washers limit the axial translation of said pair of side gears; and a pair of springs positioned within said chamber, each spring being engaged with one of said side gears to urge each of said side gears toward said pinions, wherein each of said side gears includes a cylindrically shaped portion being positioned within a counterbore in communication with said chamber, each of said springs engaging an end face of one of said cylindrically shaped portions.

9. The differential assembly of claim 8 wherein each of said side gears includes a spherically shaped portion complementing a spherically shaped surface of said housing chamber.

10. The differential assembly of claim 8 wherein said springs are shaped as washers having serpentine convolutions.

11. The differential assembly of claim 10 wherein said springs are not completely compressed when said pair of side gears are translated into contact with said side gear thrust washers.

12. The differential assembly of claim 11 wherein said springs include a substantially constant thickness cross-section.

13. A differential assembly for supplying driving torque from an input shaft to a pair of output shafts, the differential assembly comprising:

a differential housing adapted to be rotatably driven by the input shaft, said housing defining a chamber having counterbores and shaft openings at opposite ends thereof;

a pair of side gears disposed in said chamber and each having a hub disposed in one of said counterbores, said side gears being adapted to be non-rotatably mounted to the output shafts which extend through said shaft openings, each side gear being moveable along a longitudinal axis;

a pair of differential pinions rotatably mounted within said chamber, said pinions having a longitudinal axis perpendicular to the axis of said side gears with each of said pinions being meshed with each of said side gears;

a pair of side gear thrust washers, each being shaped to complement a surface of said chamber and a surface of one of said side gears, wherein said pinions and said side gear thrust washers limit the axial translation of said pair of side gears; and a pair of springs positioned within said chamber, each spring is positioned in one of said counterbores and engages an end face of said hub on one of said side gears to urge each of said side gears toward said pinions, wherein said side gear thrust washers are operable to react loads generated during speed differentiation and limit the load transferred to said springs.

14. The differential assembly of claim 13 wherein each of said side gears includes a spherically shaped portion complementing a spherically shaped surface of said housing chamber.

15. The differential assembly of claim 14 wherein said hubs on each of said side gears includes a cylindrically shaped portion extending from said spherically shaped portion, each of said cylindrically shaped portions being positioned within said counterbores in communication with said chamber.

16. The differential assembly of claim 15 wherein each of said springs is positioned within one of said counterbores and engages said end face on said cylindrically shaped portions of said hubs.

* * * * *